US012506275B2

(12) United States Patent
Algaba Brazalez et al.

(10) Patent No.: US 12,506,275 B2
(45) Date of Patent: Dec. 23, 2025

(54) POLARIZER FOR PARALLEL PLATE WAVEGUIDES

(71) Applicant: Telefonaktiebolaget LM Ericsson (publ), Stockholm (SE)

(72) Inventors: Astrid Algaba Brazalez, Gothenburg (SE); Oscar Quevedo-Teruel, Stockholm (SE); Nelson Fonseca, Noordwijk (NL); Oskar Zetterström, Uppsala (SE); Lars Manholm, Gothenburg (SE); Martin Johansson, Mölndal (SE); Freysteinn Vidarsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 253 days.

(21) Appl. No.: 18/268,972

(22) PCT Filed: Dec. 22, 2020

(86) PCT No.: PCT/EP2020/087726

§ 371 (c)(1),
(2) Date: Jun. 21, 2023

(87) PCT Pub. No.: WO2022/135709

PCT Pub. Date: Jun. 30, 2022

(65) Prior Publication Data

US 2024/0063550 A1 Feb. 22, 2024

(51) Int. Cl.
*H01Q 15/12* (2006.01)
*H01P 1/165* (2006.01)
(Continued)

(52) U.S. Cl.
CPC ............. *H01Q 15/12* (2013.01); *H01P 1/165* (2013.01); *H01P 11/00* (2013.01); *H01Q 15/02* (2013.01); *H01Q 15/246* (2013.01)

(58) Field of Classification Search
CPC ...... H01Q 15/246; H01Q 15/02; H01Q 13/06; H01Q 19/062; H01Q 25/001; H01Q 15/244; H01P 1/165; H01P 11/00; H01P 1/173
(Continued)

(56) References Cited

U.S. PATENT DOCUMENTS 7,256,753 B2 * 8/2007 Werner .............. H01Q 15/0086 343/756
7,492,329 B2 * 2/2009 Wang ..................... H01Q 15/08 343/756
(Continued)

FOREIGN PATENT DOCUMENTS

CN 105 846 109 A 8/2016

OTHER PUBLICATIONS

N. J. G. Fonseca, Q. Liao and O. Quevedo-Teruel, "The Water Drop Lens: a Modulated Geodesic Lens Antenna Based on Parallel Curves," 2018 International Symposium on Antennas and Propagation (ISAP), pp. 1-2. (Year: 2018).*
(Continued)

*Primary Examiner* — Andrea Lindgren Baltzell
*Assistant Examiner* — Victor Cole
(74) *Attorney, Agent, or Firm* — Rothwell, Figg, Ernst & Manbeck, P.C.

(57) ABSTRACT

A polarizing screen for altering a polarization state of a radio frequency waveform radiated from a parallel plate waveguide (PPW) wherein the waveform has a centre frequency and a bandwidth, the polarizing screen comprising a plurality of developable sheets arranged stacked in parallel to each other in direction of a local normal vector of a first sheet at respective inter-sheet spacings, each sheet comprising an electrically conductive pattern forming a one-dimensional periodic structure of unit-cells in an extension direction,
(Continued)

wherein the periodic structure is associated with a height measured orthogonally to the extension direction and orthogonally to the local normal vector of the shat, where each cell comprises an aperture configured to transmit the radio frequency waveform at a predetermined polarization state, wherein the height is determined in dependence of the centre frequency and/or the bandwidth of the radio frequency waveform such that the pre-determined polarization state is provided as well as matching between the PPW and a transmission medium of the radio frequency waveform.

20 Claims, 6 Drawing Sheets

(51) Int. Cl.
*H01P 11/00* (2006.01)
*H01Q 15/02* (2006.01)
*H01Q 15/24* (2006.01)

(58) Field of Classification Search
USPC .................................. 333/248, 756; 343/756
See application file for complete search history.

(56) References Cited

U.S. PATENT DOCUMENTS

| | | | | |
|---|---|---|---|---|
| 8,633,861 | B2 * | 1/2014 | De Luca | H01Q 13/0225 343/756 |
| 8,803,741 | B2 * | 8/2014 | Lam | H01Q 15/24 343/756 |
| 2013/0194052 | A1 * | 8/2013 | Zaghloul | H01Q 19/062 333/1 |
| 2019/0386398 | A1 | 12/2019 | Mahoney | |
| 2020/0335842 | A1 | 10/2020 | Legay et al. | |

OTHER PUBLICATIONS

International Search Report and Written Opinion dated Sep. 24, 2021 issued in International Patent Application No. PCT/EP2020/087726 (13 pages).

International Preliminary Report on Patentability dated Jun. 13, 2023 issued in International Patent Application No. PCT/EP2020/087726 (10 pages).

Molero, C. et al., "Design of Full-Metal Polarizing Screen Based on Circuit Modeling", Jun. 10, 2018, 2018 IEEE/MTT-S International Microwave Symposium (IMS, IEEE), XP033388254 (4 pages).

Wang, K. X. et al., "Design of a Wideband Circularly Polarized Millimeter-Wave Antenna With an Extended Hemispherical Lens", Communication, IEEE Transactions on Antennas and Propagation, vol. 66, No. 8, Aug. 2018 (6 pages).

Bartolomei, N. et al., "Circularly Polarized Parallel Plate Waveguide Multiple-Beam Lens-like Antenna for Satcom Applications", 13th European Conference on Antennas and Propagation (EuCAP 2019) (3 pages).

Dahlberg, O. et al., "Fully Metallic Flat Lens Based on Locally Twist-Symmetric Array of Complementary Split-Ring Resonators", MDPI, Symmetry 2019, vol. 11, No. 581 (8 pages).

Tang, W. et al., "Circularly Polarised Multiple Beam Antenna for Satellite Applications", 2017 11th European Conference on Antennas and Propagation (EUCAP) (3 pages).

Zhao, Y. et al., "Twisted optical metamaterials for planarized ultrathin broadband circular polarizers", Nature Communications, 2012, DOI: 10.1038/ncomms1877 (7 pages).

Wei, Z. et al., "Broadband polarization transformation via enhanced asymmetric transmission through arrays of twisted complementary split-ring resonators", Applied Physics Letters, vol. 99, 2011, https://doi.org/10.1063/1.3664774 (4 pages).

Lin, C. et al., "Circularly Polarized Horns Based on Standard Horns and a Metasurface Polarizer", IEEE Antennas and Wireless Propagation Letters, vol. 17, No. 3, Mar. 2018 (5 pages).

* cited by examiner

POLARIZER FOR PARALLEL PLATE WAVEGUIDES

CROSS REFERENCE TO RELATED APPLICATIONS

This application is a 35 U.S.C. § 371 National Stage of International Patent Application No. PCT/EP2020/087726, filed Dec. 22, 2020.

TECHNICAL FIELD

The present disclosure relates to parallel plate waveguides with polarizing screens, as well as to antenna systems and radio transceivers for radio communication. The methods, systems, and devices discussed herein enable transmitting and receiving a polarized and beam-formed radio frequency signal. Manufacturing methods for producing parallel plate waveguides (PPWs) with polarization screens are also discussed.

BACKGROUND

In wireless communication systems, such as radio frequency communication systems for cellular access and/or for satellite communications, it is often desirable to control a polarization state of the transmitted and/or received electromagnetic (EM) field. For instance, dual polarization communication systems are able to increase the total system capacity by a factor of two, reusing the same spectrum without generating interference by virtue of polarization orthogonality. This may be referred to as polarization diversity. Dual polarization communication systems may be either dual-linear polarization or dual-circular polarization.

Previous approaches to create polarizers for PPW antennas include using conventional septum polarizers integrated within a square waveguide as the one presented in "Circularly polarized parallel plate waveguide multiple-beam lens-like antenna for satcom applications," N. Bartolomei, et al., published in the Proceedings of the 13th European Conference on Antennas and Propagation (EUCAP), April 2019. In this work, an array of septums are used to generate circular polarization from a PPW quasi-optical beamformer.

U.S. Pat. No. 6,861,997 B2 presents a parallel plate septum polarizer for low profile antenna applications which comprises a modification of the standard septum where the vertical walls added to create square waveguides are removed and the stepped septum is replaced with a saw-like design based on periodic teeth. In septum polarizers a square waveguide is fed by two rectangular waveguides and each of them operates with one propagating mode, while the square waveguide, also called common waveguide, operates with two orthogonal propagating modes. The polarization of the incident signal is converted by adjusting the phase shift between these two orthogonal propagating modes.

The design described in "Circularly polarized parallel plate waveguide multiple-beam lens-like antenna for satcom applications" discussed above requires a transition between the PPW mode, a TEM mode equivalent to free-space propagation, and the TE mode, characteristic of the rectangular and square waveguides. The square aperture provides similar propagation characteristics for the two modes in the discrete aperture, which is in principle favorable for wide band operation. However, the discretization of the aperture affects the overall performance and in particular, the scanning range, as the transition between the TEM and TE modes degrades at oblique incidence.

This issue is avoided in U.S. Pat. No. 6,861,997 B2 by using a continuous aperture. However, this comes at the expense of a more dispersive polarizer behavior, resulting in more narrow band operation. This is because the TEM mode is maintained in the teeth area, while the orthogonal mode is a TE mode, with very different propagation characteristics. Thus, the desired phase shift for a given polarization conversion is only achieved at the design frequency, resulting in a narrow operating bandwidth. From previous art, there is no solution enabling simultaneous wide band polarization transformation, wide band matching to free space and wide angular scanning range compatible with a PPW device, such as a PPW quasi-optical beamformer.

The design with teeth could potentially be replaced by a design similar to the one described in "Design of a wideband circularly polarized millimeter-wave antenna with an extended hemispherical lens," by K. Wang and H. Wong, published in the IEEE Transactions on Microwave Theory and Techniques, vol. 66, no. 8, August 2018. This design uses grating dielectric and air slabs which converts the incident wave from linear polarization into circular polarization. The increase in bandwidth comes at the cost of a higher signal loss and an increased mechanical complexity as the dielectric slabs would have to be oriented at 45 degrees in the PPW flare.

An alternative concept for implementing polarization conversion is introduced in "Design of Full-Metal Polarizing Screen Based on Circuit Modeling," by C. Molero, T. Debogovic, and M. Garcia-Vigueras, published at the 2018 IEEE/MTT-S International Microwave Symposium (IMS). Here, a polarizing screen based on a fully metallic structure is used. The polarizer consists of a doubly periodic arrangement of squared-waveguide sections enclosed by two perforated screens. The perforations placed at both sides of the unit-cell allow for total transmission at a certain frequency band. Within this band, the unit-cell allows additionally to tune its anisotropy in order to transform the linear polarization of a 45° slant plane wave into circular polarization. This structure however, suffers from a bandwidth limitation. The discretization of the aperture into below-cutoff square waveguides is also expected to affect the angular stability of the polarizing screen.

The discretization of the aperture is avoided in "Broadband polarization transformation via enhanced asymmetric transmission through arrays of twisted complementary split-ring resonators", by W. Zeyong, et al., published in Applied Physics Letters, 99, 221907, September 2011. A two-dimensional array of complementary split ring resonators (CSRRs) is proposed to alter the polarization state over a broad frequency range. The design of the multi-layer CSRR unit-cell relies on two-dimensional periodic boundary conditions as described by Floquet's theorem, assuming the two orthogonal fundamental modes to have similar characteristics. However, the use of such polarizing screens with a parallel plate waveguide beamformer such as a Luneburg lens, geodesic lens, or pillbox antenna, is a challenge because the two fundamental modes in the aperture (quasi-TEM and TE01) have very different propagation characteristics, resulting in a very dispersive behavior (i.e. narrow band response). In addition, it is known that wide band performance using such screens requires a large number of layers. For instance, the evolution of the frequency response of a polarizing screen using twist symmetry as a function of the number of layers is discussed in "Twisted Optical Metamaterials for Planarized Ultrathin Broadband Circular Polarizers," by Y. Zhao, M. A. Belkin, and A. Alu, published in Nature Communications, May 2012. The results indicate that a stack of at least three layers, and preferably more, is required to achieve wide band performance. An alternative design with a simpler stack design is described in "Circularly polarised multiple beam antenna for satellite applications", by W. Tang, D. Bresciani, H. Legay, G. Goussetis, and Nelson J. G. Fonseca, published in the Proceedings of the 11th European Conference on Antennas and Propagation (EUCAP), March 2017. In this case, only one layer is needed to obtain wide band performance, but the screen operates in reflection only. All these periodic polarizing screen solutions, either in transmission or in reflection, would require the screen to be located at a distance from the PPW aperture so that the design assumptions (Floquet's theorem) remain valid. This results in a bulky implementation, which is undesirable since small footprint components and antenna systems are generally preferred.

Consequently, there is a need for more compact PPW structures which provide both wideband matching to free space and polarization transformation of the EM field, and which can be used for lens antenna applications such as quasi-optical beamformers.

SUMMARY

It is an object of the present disclosure to provide compact PPW structures which provide both wideband matching to free space and polarization transformation of the EM field, and which can be used for lens antenna applications such as quasi-optical beamformers in both cellular access networks and for satellite based communications.

This object is at least in part obtained by a polarizing screen for altering a polarization state of a radio frequency waveform radiated from a parallel plate waveguide, which waveform has a centre frequency and a bandwidth. The polarizing screen comprises a plurality of developable sheets arranged stacked in parallel to each other in direction of a local normal vector V of a first sheet at respective inter-sheet spacings. Each sheet comprises an electrically conductive pattern forming a one-dimensional periodic structure of unit-cells in an extension direction D, wherein the periodic structure is associated with a height measured orthogonally to the extension direction D and orthogonally to the local normal vector V of the sheet, and where each cell comprises an aperture configured to transmit the radio frequency waveform at a pre-determined polarization state. The height is determined in dependence of the centre frequency and/or the bandwidth of the radio frequency waveform such that the pre-determined polarization state is provided as well as matching between the PPW and a transmission medium of the radio frequency waveform.

Thus, a compact PPW structure with the ability to alter a polarization state of the radiated EM field is provided. The disclosed polarizing screen also provides matching to the transmission medium, which is an advantage. The height of the screen is preferably smaller than a wavelength corresponding to the centre frequency of the radio frequency waveform, and more preferably about half-a-wavelength, which means that the screen will allow for compact PPWs of small footprint, especially when used at higher carrier frequencies such as around 80 GHz.

According to aspects, the polarizing screen comprises two, three or four sheets, and preferably just two sheets. It is an advantage from both cost and physical footprint perspectives that only this relatively small number of sheets are required. Also, due to the small number of layers in the screen, the polarizing screen can be manufactured in a low-cost process, which is an advantage.

According to aspects, the electrically conductive patterns of adjacent sheets differ in terms of a rotation of the unit-cells about respective unit-cell centre axes A parallel to the normal vector V. For instance, the unit-cells can be formed as complementary split ring resonators (CSRRs), with dimensions determined in dependence of the centre frequency and/or the bandwidth of the radio frequency waveform. The CSRRs of one sheet are rotated about the centre axes A at an angle relative to the CSRRs of an adjacent sheet or relative to a reference angle associated with the PPW. The reference angle, may, e.g., correspond to a vertical or horizontal direction. The CSRRs have been found to yield good performance and are also possible to manufacture in a cost-efficient manner. However, other types of unit cells can also be used in a polarizing screen according to the present disclosure. For instance, the unit-cells can be formed as any of: conformal split square (rectangle) resonators, slots, dual slots, or dog-bone slots, where the unit-cells of one sheet are rotated about a centre axes A of the respective unit-cell at an angle relative to the unit-cells of an adjacent sheet.

According to aspects, the sheets are metal sheets, and the electrically conductive patterns are formed as apertures in the sheets, where a sheet is between 0.1 mm and 1.0 mm thick, and preferably about 0.3 mm thick. This range of thicknesses imply that the sheets can be easily bent to conform to different aperture geometries of the PPW, e.g., a curved surface or a flat surface, which is an advantage. Also, the apertures can be formed in a cost-efficient manner.

According to aspects, the electrically conductive sheets are arranged as metallized surfaces on one or more dielectric carrier members. This way the polarizing screen can be manufactured with high precision in a cost-effective manner, which is an advantage. The one or more dielectric carrier members can also be integrally formed with a part of the PPW. This way the entire part of the PPW including the polarizing screen can be formed in a dielectric material and then metallized in a single manufacturing step.

The object of the present disclosure is also obtained by a parallel plate waveguide arrangement comprising at least one polarizing screen according to the above-mentioned aspects. The polarizing screen is arranged in a vicinity of a peripheral edge of the PPW to simultaneously alter a polarization state of a radio frequency waveform radiated from the PPW and also to provide matching with respect to a transmission medium.

To improve the PPW arrangement further, a tapered section is optionally arranged adjacent to and leading up to the at least one polarizing screen.

According to aspects, the PPW arrangement comprises a quasi-optical beamformer, preferably a lens such as a Luneburg lens formed as a geodesic lens, a metasurface lens, or a gradient-index dielectric lens. Thus, the concepts disclosed herein are applicable together with a wide range of different devices.

According to aspects, the PPW arrangement comprises a plurality of antenna ports arranged along a part of the lens periphery opposite from the polarizing screen and separated tangentially along the lens periphery. This way the PPW arrangement can be used for beamforming, e.g., radio communication signals in an access network or in a satellite communication system.

This object is also obtained by an antenna system comprising a PPW arrangement comprising a plurality of lenses stacked along a lens axis. This type of antenna system can, for instance, be arranged as a dual polarized lens antenna comprising a first type of polarizing screen associated with a first polarization and a second type of polarizing screen associated with a second polarization different from the first polarization.

There are also disclosed herein methods for manufacturing polarization screens and PPW arrangements, as well as control units associated with the above advantages.

BRIEF DESCRIPTION OF THE DRAWINGS

The present disclosure will now be described in more detail with reference to the appended drawings, where.

DETAILED DESCRIPTION

Figure 1:
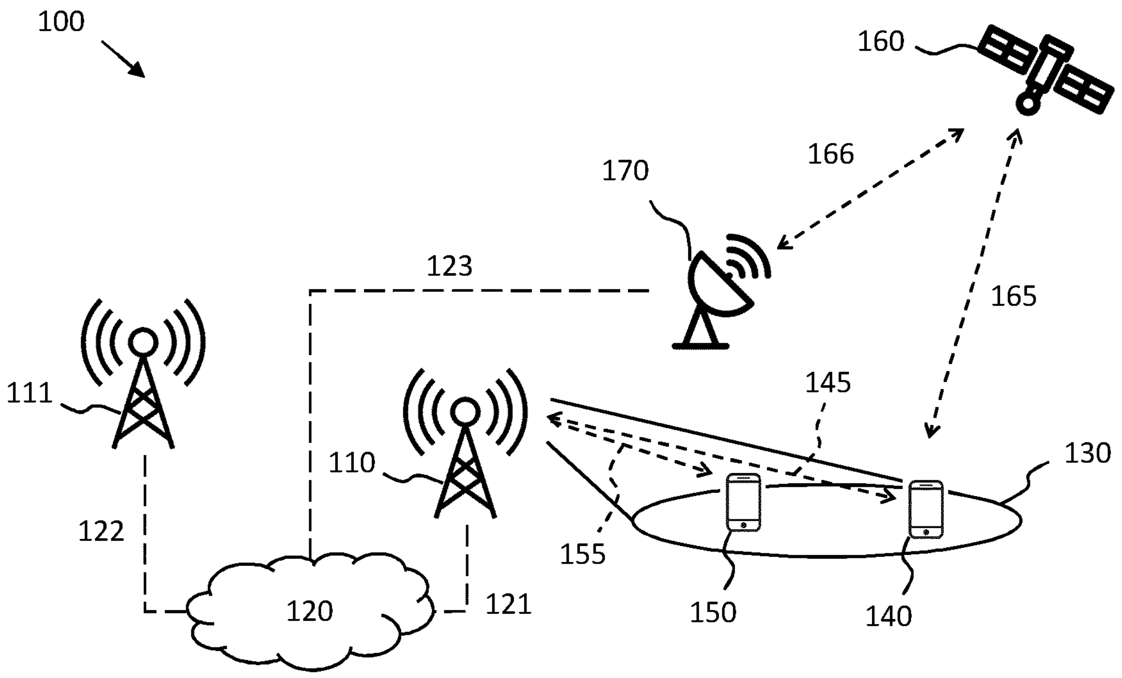
FIG. 1 shows aspects of an example communication system.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms “a”, “an” and “the” are intended to include the plural forms as well, unless the context clearly indicates otherwise.

FIG. 1 illustrates an example communication system 100 where access points 110, 111 provide wireless network access to wireless devices 140, 150 over a coverage area 130. An access point in a fourth generation (4G) 3GPP network is normally referred to as an evolved node B (eNodeB), while an access point in a fifth generation (5G) 3GPP network is referred to as a next generation node B (gNodeB). The access points 110, 111 are connected to some type of core network 120, such as an evolved packet core network (EPC). The EPC is an example of a network which may comprise wired communication links, such as optical links 121, 122.

The communication system 100 may also comprise one or more satellite transceivers 160 arranged to establish and to maintain a communication link 165 to the wireless devices 140, 150. The satellite transceiver 160 may also be arranged to establish and to maintain a communication link 166 to a land-based satellite communication transceiver 170, which may be connected 123 to the EPC 120 or to some other wireline communication network.

The wireless access network 100 supports at least one radio access technology (RAT) for communicating 145, 155 with wireless devices 140, 150, at times referred to as user equipment (UE). It is appreciated that the present disclosure is not limited to any particular type of wireless access network type or standard, nor any particular RAT. The techniques disclosed herein are, however, particularly suitable for use with 3GPP defined wireless access networks.

The roles and benefits of satellites in 5G have been studied in 3GPP, see, e.g., 3GPP TS 22.261 V18.0.0 (2020-09). Satellite-based communication is foreseen as especially relevant for mission critical and industrial applications where ubiquitous coverage is crucial.

Herein, satellite communication refers to communication to or via spaceborne vehicles in Low Earth Orbits (LEO), Medium Earth Orbits (MEO), Geostationary Earth Orbit (GEO) or in Highly Elliptical Orbits (HEO). It may also extend to communication to or via so-called pseudo-satellites or atmospheric satellites, such as high altitude platforms (HAPs), drones and atmospheric balloons.

Figure 2A:
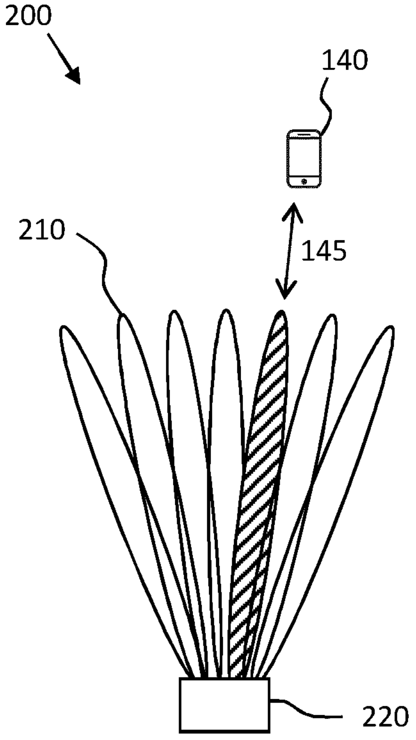
FIGS. 2A-B schematically illustrate multiple beam antenna systems comprising a beamforming device.

FIG. 2A illustrates an example polarized communication system 200 where an antenna arrangement 220 generates a plurality of antenna beams of a first polarization 210 for communicating 145 with a wireless device 140.

Figure 2B:
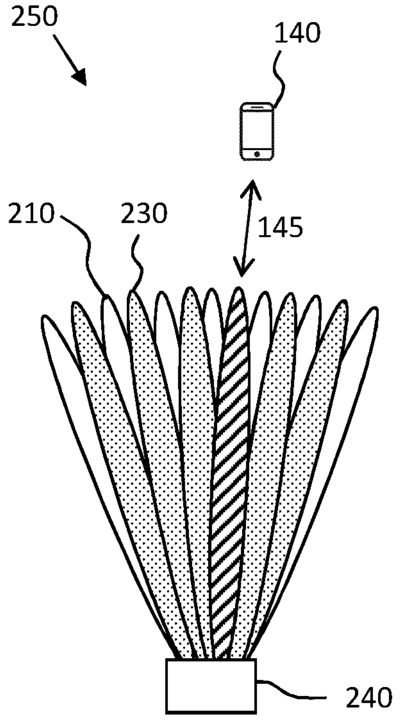

FIG. 2B illustrates another polarized communication system 250 based on a dual-polarized antenna arrangement 240, where the beams of the first polarization 210 have been complemented by beams of a second polarization 230. The communication system 250 is generally associated with an increased total capacity compared to the communication system 200 in FIG. 2A.

The present disclosure relates to a compact PPW structure which provides both wideband matching to free space and also polarization transformation. This kind of structure can be used with advantage for lens antenna applications or other antennas based on quasi-optical beamformers. For instance, the PPW structures and antenna arrangements discussed herein can be used with advantage in the radio transceivers discussed above in connection to FIG. 1.

At millimeter-wave frequencies, losses are critical and fully metallic EM devices, based for example on waveguide components, are often preferred. However, discrete beam forming networks become complex as the aperture size increases. For such applications, there is an interest in using PPWs, which are mechanically simple and tolerant to manufacturing errors, leading to possible cost savings in mass production. They also provide very wide mono-mode frequency bandwidth, suitable for millimeter-wave wireless communications. A major limitation of PPW devices is that they operate in a single linear polarization state, perpendicular to the waveguide plates. It would be advantageous to have a polarizer altering the polarization state of a PPW without compromising its advantages.

The designs proposed herein evolve around a polarizer for PPWs with a one-dimensional periodic structure that provides wideband matching to free-space and polarization conversion at the same time. The implementation relies on thin polarizing sheets or metallized surfaces that may be bent to adapt to the curvature of the aperture (e.g. in combination with a Luneburg or geodesic lens). In other words, the polarizing sheets discussed herein are developable. A developable surface is a smooth surface with zero Gaussian curvature. That is, it is a surface that can be flattened onto a plane without distortion (i.e. it can be bent without stretching or compression). Conversely, it is a surface which can be made by transforming a plane (i.e. "folding", "bending", "rolling", "cutting" and/or "gluing"). In three dimensions all developable surfaces are ruled surfaces (but not vice versa). The envelop of a single parameter family of planes is called a developable surface.

The polarizing screens disclosed herein provide linear polarization rotation (±45°) to enable polarization diversity from a stack of PPW beamformers. The size of the aperture in the dimension perpendicular to the plane of the lens is less than a wavelength (typically around half-a-wavelength), thus enabling beam scanning along the direction orthogonal to the PPW beamformers using a stack of PPW beamformers, which is an advantage. Alternatively, the polarizing screens may be designed to change linear polarization into circular polarization. Polarization diversity is then obtained with a stack of PPW beamformers combining screens altering the linear polarization of the PPW into left hand and right hand circular polarizations.

Herein, half-a-wavelength is a measure corresponding to approximately half the wavelength of the EM field measured at center frequency. According to some aspects, half-a-wavelength is a range of wavelengths from about 80% of the wavelength at center frequency to 120% of the wavelength at center frequency.

Aspects of the proposed concept comprise two or three layers of unit-cell elements arranged in parallel to obtain wide band polarization conversion. Usually, when designing such unit-cells, a free-space two-dimensional periodic environment (Floquet's theorem) is considered and not a parallel plate waveguide environment as it is the case here. As described above, the PPW environment results in a highly dispersive behavior, particularly when the height of the PPW aperture is small compared to the wavelength (typically half-a-wavelength). Therefore, it is not obvious and indeed somewhat surprising that wide band performance can be maintained in a design of the type presented herein. In addition, electrically small apertures are known to provide poor matching to free-space. The proposed design combines these two functionalities into a flare structure, namely the functionalities of polarization conversion and matching to free space. In the PPW environment, a counter intuitive property was also discovered, which is that better performances are obtained with a smaller number of layers, typically two or three. It is, however, appreciated that a design with a single thin layer is not theoretically possible.

Aspects of the proposed solution relate to fully metallic structures, which use two or three sheets comprising respective one-dimensional periodic designs based on sub-wavelength elements (typically half-a-wavelength), of e.g. twist-symmetric complementary CSRRs. The starting point of the sheet pattern design is a conventional periodic unit-cell approach. This type of unit-cell is applied to rotate the electric field in steps in such a way that vertical polarization is transformed into, e.g., a ±45° polarization angle relative to a common reference angle.

Figure 3:
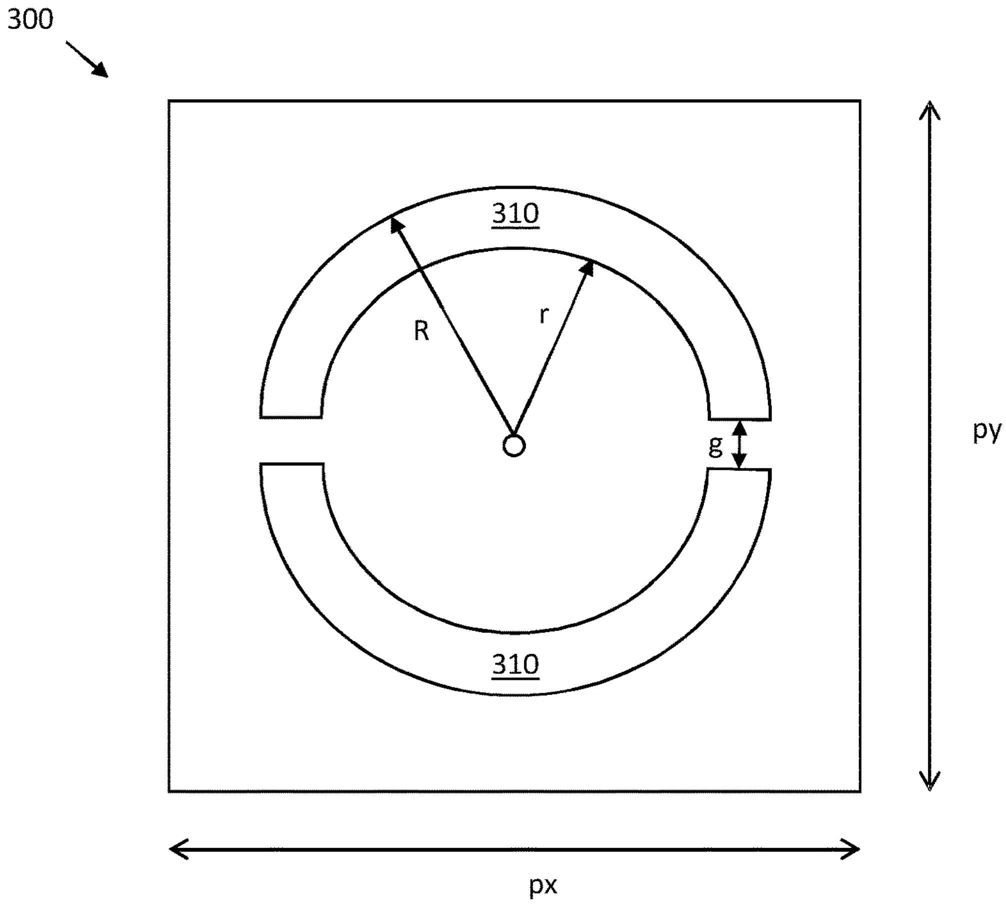
FIG. 3 illustrates an example complementary split ring resonator (CSRR) unit-cell.

FIG. 3 illustrates an example CSRR unit-cell 300. The CSRR unit-cell comprises an arcuate form aperture 310 with outer and inner radii R and r, respectively, i.e., the CSRR aperture width is R-r. The separation of the arcuate segments of the CSRR is referred to as g. The height of the unit-cell is py and its width is px.

Figure 4A:
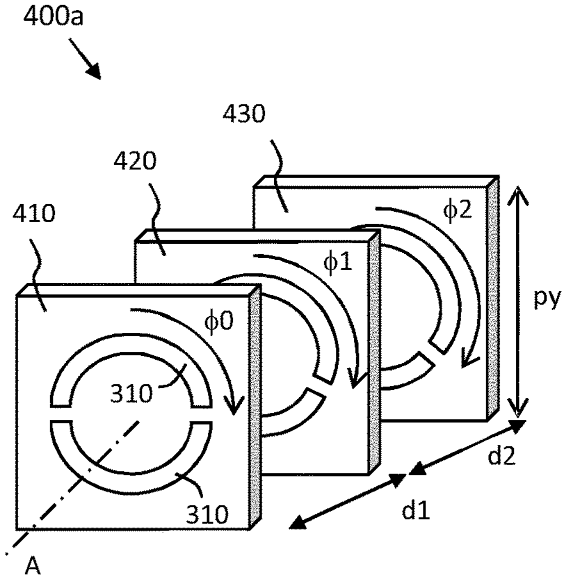
FIGS. 4A-B show stacks of unit-cells for polarizing a radio frequency waveform.
Figure 4B:
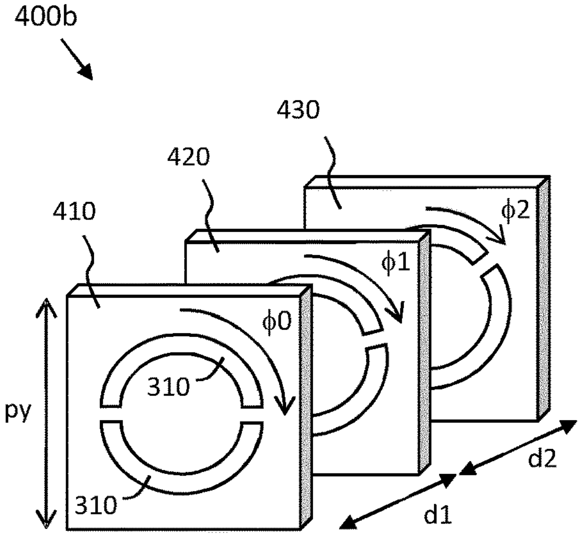

FIGS. 4A and 4B shows stacks 400*a*, 400*b* of unit-cells 410, 420, 430 arranged in parallel with apertures 310 facing in the same direction. The unit-cells of one layer has been rotated about a unit-cell central axis A at an angle ϕ0, ϕ1, ϕ2, measured relative to a rotation angle ϕ0 of the first layer of unit-cells or relative to some other reference angle. The inter-sheet spacings are referred to as d1 and d2 in FIGS. 4A and 4B. The geometry in FIG. 4A provides a first polarization state of the EM field while the geometry in FIG. 4B provides another polarization state of the EM field. The obtained polarization state is a function of, among other things, the sequence of rotation angles ϕ0, ϕ1, ϕ2

According to an example, the below values provide an example of dimensions for use in polarizing a radio frequency waveform at carrier frequency 28 GHz with a bandwidth of 6 GHz.

| Parameter | Value |
|---|---|
| px | 5.5 mm |
| py | 5.5 mm |
| R | 2.6 mm |
| r | 1.6 mm |
| d1 | 2.55 mm |
| d2 | 2.6 mm |
| ϕ1-ϕ0 | 22 degrees |
| ϕ2-ϕ0 | 45 degrees |

Figure 5:
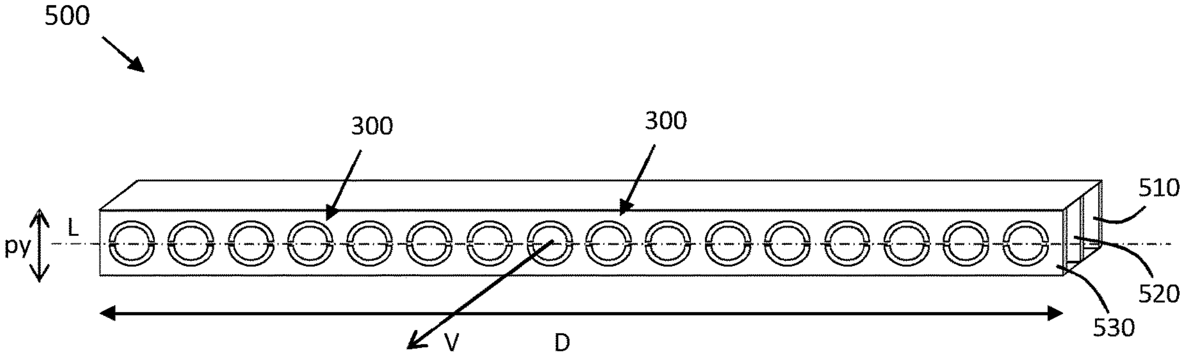
FIG. 5 illustrates a polarizing screen comprising stacked rows of unit-cells.

FIG. 5 shows an example polarizing screen 500 arranged to alter a polarization state of a radio frequency waveform, having a centre frequency and a bandwidth, in a PPW environment. In this example the polarizing screen has a straight elongated profile where the unit-cells 300 are arranged with equal spacing along a straight line L extending in extension direction D. The polarizing screen 500 comprises sheets 510, 520, 530 with unit-cells 300 which are integrated within an extended PPW configuration. The height of the polarizing screen 500, py, is determined in dependence of the centre frequency and/or the bandwidth of the radio frequency waveform such that the pre-determined polarization state is provided as well as matching between the PPW and a transmission medium of the radio frequency waveform. Preferably, the height py is smaller than a wavelength corresponding to the centre frequency of the radio frequency waveform, and preferably about half-a-wavelength at centre frequency.

Each sheet in the plurality of developable sheets 510, 520, 530 is arranged stacked in parallel to the other sheets in direction of a local normal vector V of a first sheet 510 at respective inter-sheet spacings d1, d2. Each sheet 510, 520, 530 comprises an electrically conductive pattern forming a one-dimensional periodic structure of unit-cells 300, 410, 420, 430 in the extension direction D. The height py is measured orthogonally to the extension direction D and also orthogonally to the local normal vector V of the sheet as shown in, e.g., FIG. 5. It is appreciated that each unit-cell comprises an aperture 310 configured to transmit a radio frequency waveform at a pre-determined polarization state.

As noted above, the polarizing screen preferably comprises two, three or four sheets, and preferably two sheets. As noted above, this is not in agreement with the prior art where the prevailing opinion has been that more sheets provide better performance, not worse performance. However, in this context, more than three or four sheets arranged in parallel will not improve polarization transformation nor matching to free space, because of the dispersive nature of a PPW operated with two modes, the quasi-TEM and the TE01 modes The electrically conductive patterns of adjacent sheets differ in terms of a rotation ϕ0, ϕ1, ϕ2 of the unit-cells 300, 410, 420, 430 about respective unit-cell centre axes A parallel to the normal vector V.

According to an example, with reference to FIGS. 4A and 4B, the unit-cells 300, 410, 420, 430 are formed as complementary split ring resonators (CSRRs) where the CSRRs of one sheet is rotated about the centre axes A at an angle ϕ0, ϕ1, ϕ2 relative to the CSRRs of an adjacent sheet. However, with reference to FIGS. 14A-D, the unit-cells may also be formed as any of: conformal split square rectangle resonators 1440, slots 1410, dual slots 1420, or dog-bone slots 1430, where the unit-cells of one sheet are rotated about a centre axes A of the respective unit-cell at an angle ϕ relative to the unit-cells of an adjacent sheet. Such elements are generally known and will therefore not be discussed in more detail herein.

Figure 6:
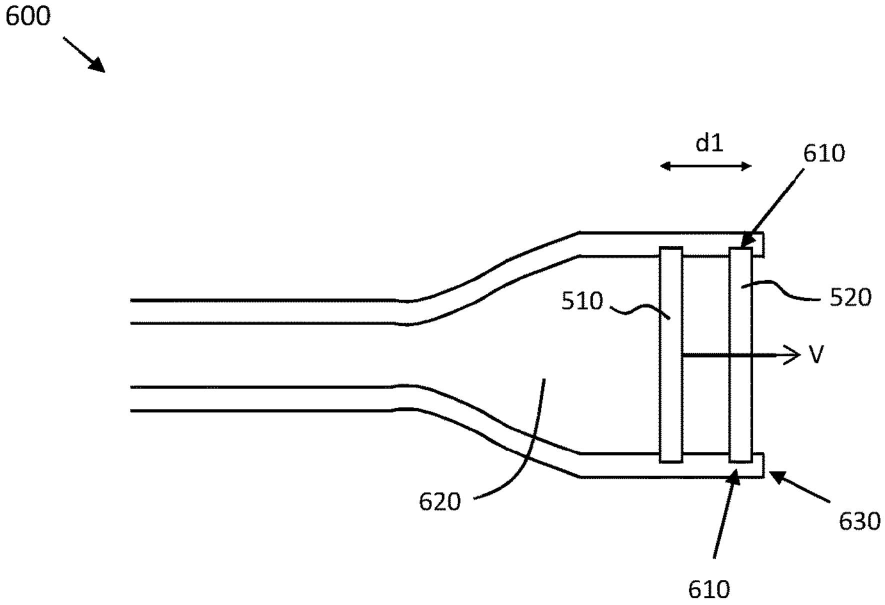
FIG. 6 illustrates a tapered transition towards a polarizing screen.

FIG. 6 illustrates details of an example PPW 600 with an integrated polarizing screen integrated in vicinity of the PPW aperture or edge 630. A tapered section 620 or tapered transition is arranged adjacent to and leading up to the at least one polarizing screen sheet 510, 520. The tapered transition from the lens to the polarizer is implemented in order to reduce the reflections between the two components. In this example, electrically conductive sheets are arranged as separate members with first and second opposing edges configured to be received in respective opposing slots 610 of the PPW. It is noted that this edge and slot configuration can be applied both to straight sheets as well as to arcuate sheets which are configured conformal to a bent aperture of, e.g., a geodesic lens antenna arrangement.

The sheets 510, 520 making up the polarizing screen can be constructed as metal sheets and the electrically conductive patterns can be formed as apertures cut or otherwise machined in the sheets. A sheet can be anywhere from about 0.1 mm to 1.0 mm thick, and preferably about 0.3 mm thick. This thickness allows bending of the sheet to conform to, e.g., arcuate shapes and the like.

Figure 7:
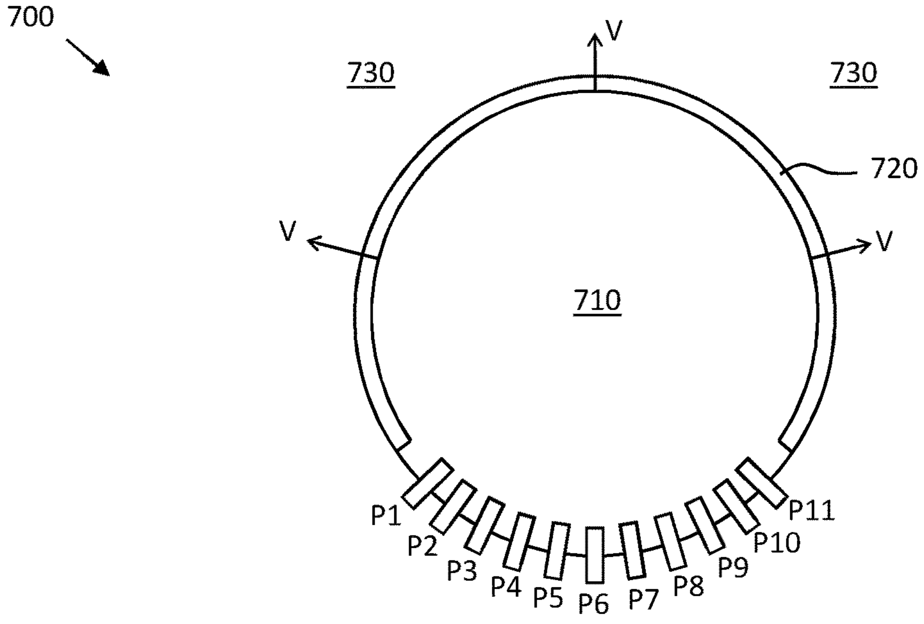
FIG. 7 shows a Luneburg lens antenna with antenna ports and a polarizing screen.

FIG. 7 illustrates an example PPW shaped as a Luneburg lens. This type of PPW geodesic lens can be based on parallel curves to realize a low-profile beamformer with a wide angular scanning range, and has been shown to yield a high performing yet compact antenna. PPWs such as this was described in “The water drop lens: a modulated geodesic lens antenna based on parallel curves”, by Nelson J. G. Fonseca, Qingbi Liao and Oscar Quevedo-Teruel, published in the proceedings of the 2018 international symposium on antennas and propagation (ISAP 2018), Oct. 23-26, 2018.

The PPW arrangement 700 exemplified in FIG. 7 comprises at least one polarizing screen 720 arranged in a vicinity of a peripheral edge of the PPW to provide simultaneous alteration of the polarization state of a radio frequency waveform and matching with respect to a transmission medium 730 such as air. In this case the polarizing screen 720 has an arcuate profile where the unit-cells 300 are arranged with equal spacing along an arcuate line. However, the polarizing screens disclosed herein may be conformally shaped to match any aperture of a PPW which can be flattened onto a plane without distortion, which is an advantage. Thus, the PPW arrangements discussed herein may also be generally formed as a quasi-optical beamformer, preferably a lens such as a Luneburg lens formed as a geodesic lens, a metasurface lens, or a gradient-index dielectric lens.

The PPW arrangement 700 in FIG. 7 comprises a plurality of antenna ports P1-P11 arranged along a part of the lens periphery opposite from the polarizing screen 720 and separated tangentially along the lens periphery as illustrated schematically in FIG. 7. Each port generates an antenna beam with a respective pointing direction, similar to the example discussed in connection to FIG. 2A above. It is appreciated that a single Luneburg lens such as that shown in FIG. 7 is associated with a single polarization. In “The water drop lens: a modulated geodesic lens antenna based on parallel curves”, by Nelson J. G. Fonseca, Qingbi Liao and Oscar Quevedo-Teruel, published in the proceedings of the 2018 international symposium on antennas and propagation (ISAP 2018), Oct. 23-26, 2018, more details of this type of antenna arrangement is given.

Figure 8:
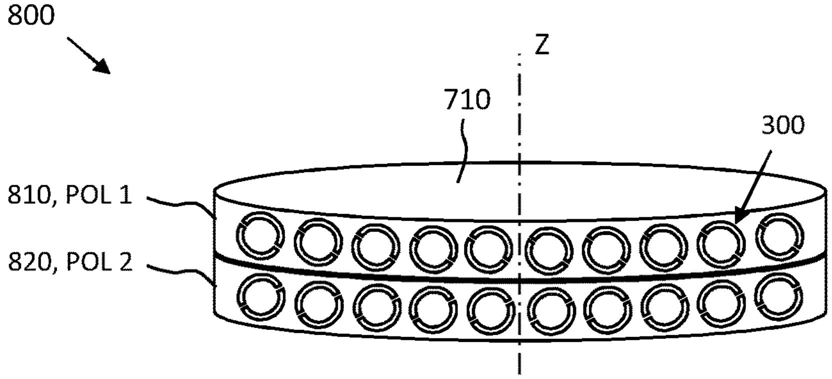
FIGS. 8-9 schematically illustrate stacks of Luneburg lenses comprising polarizing screens.

FIG. 8 shows an example of an antenna system 800 arranged as a dual polarized lens antenna comprising a first type of polarizing screen 810 associated with a first polarization POL 1 and a second type of polarizing screen 820 associated with a second polarization POL 2 different from the first polarization. By stacking PPWs on top of each other in this manner along a lens axis Z, a dual polarization antenna system can be created which has low profile.

Figure 9:
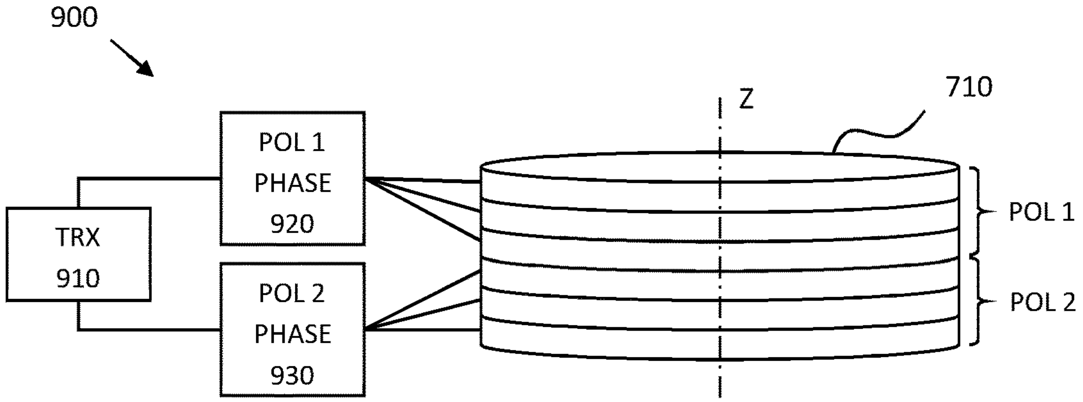

FIG. 9 shows an antenna system 900 comprising a PPW arrangement with a plurality of lenses 710 stacked along the lens axis Z. By providing separate feed networks for each polarization, the elevation properties of the antenna beams can be improved. Also, active beam steering at least in the elevation domain can be realized if the transceiver 910 is configured to control the feed networks 920, 930 to control the phases of the transmitted signals on the different ports and lenses.

Figure 10A:
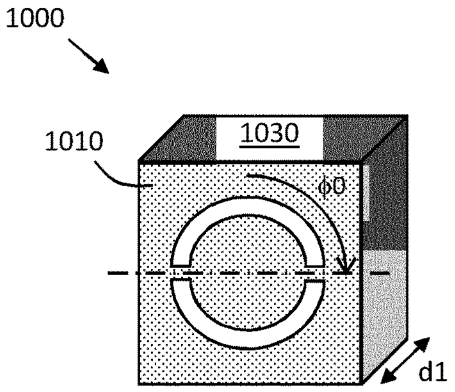
FIGS. 10A-B shows front and back sides of a metallized dielectric carrier member.
Figure 10B:
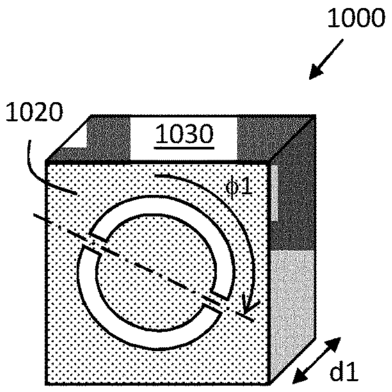

FIG. 10 exemplifies yet another method of realizing the polarization screen 1000. Here, the electrically conductive sheets are arranged as metallized surfaces 1010, 1020 on one or more dielectric carrier members 1030. The front side of a part of one such dielectric carrier member 1030 is illustrated in FIG. 10A while the back side of the same dielectric carrier member 1030 is shown in FIG. 10B. According to aspects, the one or more dielectric carrier members are made of Polytetrafluoroethylene, PTFE, or from polymers, such as polyether ether ketone, PEEK, polyimide, Kapton®, and polycarbonate, PC.

In case a larger separating distance is required between adjacent sheets, the sheets may be realized as metallized surfaces on separate carrier members. I.e., for a two-sheet design, two separate thinner dielectric carrier members can be used, each with a single metallized surface. This has the additional advantage of requiring less dielectric material, resulting in lower losses. This way one or more dielectric carrier members can be integrally formed with a part of the PPW, and the metallization can be applied to generate the unit-cell apertures in a cost efficient and robust manner.

Figure 11:
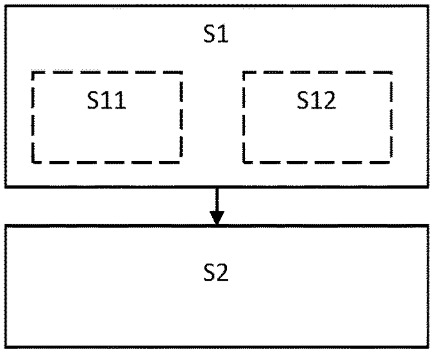
FIG. 11 is a flow chart illustrating methods.

FIG. 11 shows a flow chart illustrating a method for manufacturing a PPW arrangement configured to alter a polarization state of a radio frequency waveform 145, 155, 165, 166 having a centre frequency and a bandwidth, i.e., a PPW according to the above discussion. The method comprises producing S1 a plurality of developable sheets 510, 520, 530 arranged in parallel to each other in direction of a normal vector V of a first sheet 510 at respective inter-sheet spacings d1, d2. Each sheet 510, 520, 530 comprises an electrically conductive pattern forming a one-dimensional periodic structure of unit-cells 300, 410, 420, 430, where each cell comprises an aperture 310 configured to transmit the radio frequency waveform at a pre-determined polarization state, and integrating S2 the plurality of developable sheets 510, 520, 530 at a peripheral edge of the PPW.

According to one example, discussed above in connection to, e.g., FIG. 6, the method comprises producing S11 the plurality of developable sheets as separate metal sheets 510, 520 with edges configured to be received in slots 610 formed in the PPW.

According to another example, discussed above in connection to, e.g., FIGS. 10A and 10B, the method comprises producing S12 the plurality of developable sheets as metallized surfaces 1010, 1020 on one or more dielectric carrier members 1030.

Figure 12:
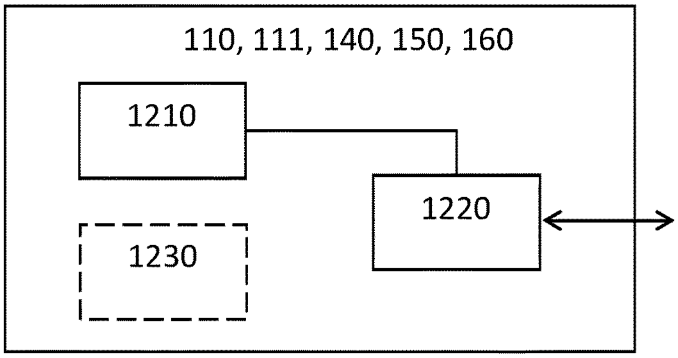
FIG. 12 schematically illustrates processing circuitry.

FIG. 12 schematically illustrates, in terms of a number of functional units, the general components of a network node 110, 111, 120, 140, 150, 160, 170 according to embodiments of the discussions herein. Processing circuitry 1210 is provided using any combination of one or more of a suitable central processing unit CPU, multiprocessor, microcontroller, digital signal processor DSP, etc., capable of executing software instructions stored in a computer program product, e.g. in the form of a storage medium 1230. The processing circuitry 1210 may further be provided as at least one application specific integrated circuit ASIC, or field programmable gate array FPGA.

Particularly, the processing circuitry 1210 is configured to cause the device 110, 120 to perform a set of operations, or steps, such as the methods discussed in connection to FIG. 8 and the discussions above. For example, the storage medium 1230 may store the set of operations, and the processing circuitry 1210 may be configured to retrieve the set of operations from the storage medium 1230 to cause the device to perform the set of operations. The set of operations may be provided as a set of executable instructions. Thus, the processing circuitry 1210 is thereby arranged to execute methods as herein disclosed. In other words, there is shown a network node 110, 111, 120, 140, 150, 160, comprising processing circuitry 1210, a network interface 1220 coupled to the processing circuitry 1210 and a memory 1230 coupled to the processing circuitry 1210, wherein the memory comprises machine readable computer program instructions that, when executed by the processing circuitry, causes the network node to transmit and to receive a radio frequency waveform 145, 155, 165, 166.

The storage medium 1230 may also comprise persistent storage, which, for example, can be any single one or combination of magnetic memory, optical memory, solid state memory or even remotely mounted memory.

The device 110, 111, 120, 140, 150, 160 may further comprise an interface 1220 for communications with at least one external device. As such the interface 1220 may comprise one or more transmitters and receivers, comprising analogue and digital components and a suitable number of ports for wireline or wireless communication.

The processing circuitry 1210 controls the general operation of the device 110, 111, 120, 140, 150, 160, e.g., by sending data and control signals to the interface 1220 and the storage medium 1230, by receiving data and reports from the interface 1220, and by retrieving data and instructions from the storage medium 1230. Other components, as well as the related functionality, of the control node are omitted in order not to obscure the concepts presented herein.

Figure 13:
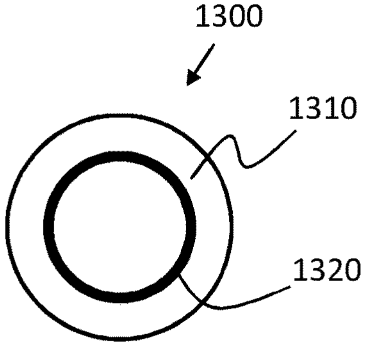
FIG. 13 shows a computer program product.
Figure 14A:
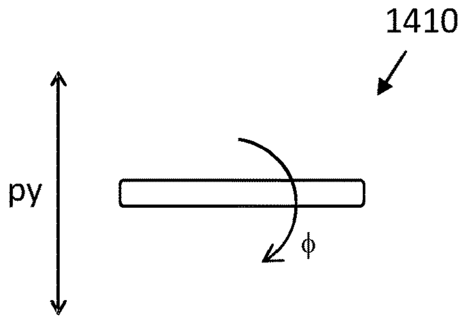
FIGS. 14A-D schematically illustrate a number of example unit cell geometries.
Figure 14B:
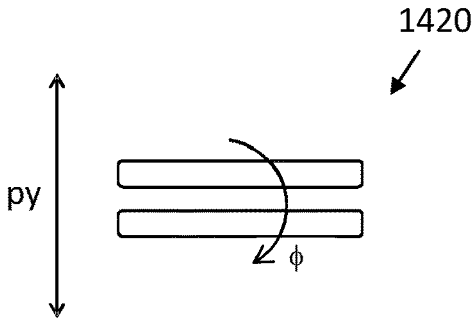
Figure 14C:
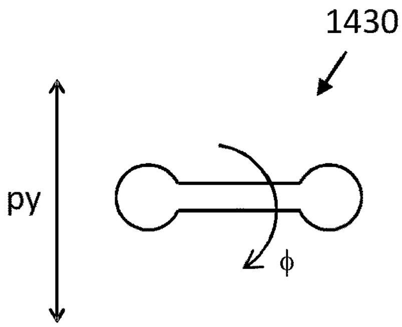
Figure 14D:
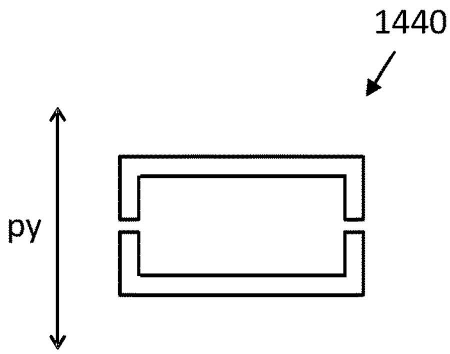

FIG. 13 illustrates a computer readable medium 1310 carrying a computer program comprising program code means 1320 for performing the methods illustrated in, e.g., FIG. 11, when said program product is run on a computer. The computer readable medium and the code means may together form a computer program product 1300.

The invention claimed is:

1. A polarizing screen for altering a polarization state of a radio frequency waveform radiated from a parallel plate waveguide (PPW), wherein the waveform has a center frequency and a bandwidth, the polarizing screen comprising:

a first sheet; and a second sheet arranged in parallel with the first sheet in direction of a local normal vector of the first sheet, wherein the second sheet is spaced apart from the first sheet by an inner-sheet spacing therein forming an unfilled space between the first sheet and the second sheet, the first sheet comprises a first electrically conductive pattern forming a first periodic structure of unit-cells in an extension direction, wherein the first periodic structure is associated with a height measured orthogonally to the extension direction and orthogonally to the local normal vector of the first sheet, where each unit-cell of the first periodic structure of unit-cells comprises an aperture configured to transmit the radio frequency waveform at a pre-determined polarization state, the second sheet comprises a second electrically conductive pattern forming a second period structure of unit-cells in the extension direction, wherein the second periodic structure is associated with the height, where each unit-cell of the second periodic structure of unit-cells comprises an aperture configured to transmit the radio frequency waveform at the pre-determined polarization state, and the height is determined in dependence of the center frequency and/or the bandwidth of the radio frequency waveform such that the pre-determined polarization state is provided as well as matching between the PPW and a transmission medium of the radio frequency waveform.

2. The polarizing screen of claim 1, wherein the height is smaller than a wavelength corresponding to the center frequency.

3. The polarizing screen of claim 1, comprising two, three or four sheets.

4. The polarizing screen of claim 1, wherein the electrically conductive patterns of adjacent sheets differ in terms of a rotation of the unit-cells about respective unit-cell center axes parallel to the normal vector.

5. The polarizing screen of claim 1, wherein the unit-cells are formed as complementary split ring resonators, CSRRs, with dimensions (py, px, g, r, R) determined in dependence of the center frequency and/or the bandwidth of the radio frequency waveform where the CSRRs of one sheet are rotated about the center axes at an angle relative to the CSRRs of an adjacent sheet or relative to a reference angle associated with the PPW.

6. The polarizing screen of claim 1, wherein the unit-cells are formed as any of: conformal split square (rectangle) resonators, slots, dual slots, or dog-bone slots, where the unit-cells of one sheet are rotated about a center axes of the respective unit-cell at an angle relative to the unit-cells of an adjacent sheet.

7. The polarizing screen of claim 1, wherein the sheets are metal sheets and where the electrically conductive patterns are formed as apertures in the sheets, where a sheet is between 0.1 mm and 1.0 mm thick.

8. The polarizing screen of claim 1, wherein the polarizing screen has a straight elongated profile where the unit-cells are arranged with equal spacing along a straight line.

9. The polarizing screen of claim 1, wherein the polarizing screen has an arcuate profile and where the unit-cells are arranged with equal spacing along an arcuate line, or the polarizing screen is shaped to match an aperture of the PPW.

10. The polarizing screen claim 1, wherein
the electrically conductive sheets are arranged as metallized surfaces on one or more dielectric carrier members, and
the one or more dielectric carrier members are integrally formed with a part of the PPW.

11. The polarizing screen of claim 1, wherein the electrically conductive sheets are arranged as separate members with first and second opposing edges configured to be received in respective opposing slots of a PPW.

12. The polarizing screen claim 1, wherein
the electrically conductive sheets are arranged as metallized surfaces on one or more dielectric carrier members, and
the one or more dielectric carrier members are made of Polytetrafluoroethylene, (PTEE) polymers.

13. A parallel plate waveguide (PPW) arrangement comprising at least one polarizing screen of claim 1, wherein the polarizing screen is arranged with respect to a peripheral edge of the PPW to simultaneously alter a polarization state of the radio frequency waveform radiated from the PPW and also provide matching with respect to a transmission medium.

14. An antenna system comprising:
the PPW arrangement of claim 13;
and a plurality of lenses stacked along a lens axis.

15. The antenna system of claim 14, arranged as a dual polarized lens antenna comprising a first type of polarizing screen associated with a first polarization and a second type of polarizing screen associated with a second polarization different from the first polarization.

16. The PPW arrangement of claim 13, comprising a tapered section arranged adjacent to and leading up to the at least one polarizing screen.

17. The PPW arrangement of claim 13, comprising first and second opposing slots configured to receive respective opposing edges of an electrically conductive sheet comprised in the polarizing screen.

18. The PPW arrangement of claim 13, further comprising:
a quasi-optical beamformer; and
a plurality of antenna ports arranged along a part of the lens periphery opposite from the polarizing screen and separated tangentially along the lens periphery.

19. A method for manufacturing a parallel plate waveguide, PPW arrangement configured to alter a polarization state of a radio frequency waveform having a center frequency and a bandwidth, the method comprising:
producing a first sheet; and
a second sheet arranged in parallel with the first sheet in direction of a normal vector of the first sheet, wherein
the second sheet is spaced apart from the first sheet by an inner-sheet spacing therein forming an unfilled space between the first sheet and the second sheet,
the first sheet comprises a first electrically conductive pattern forming a first periodic structure of unit-cells in an extension direction, wherein the first periodic structure is associated with a height measured orthogonally to the extension direction and orthogonally to the local normal vector of the first sheet, where each unit-cell of the first periodic structure of unit-cells comprises an aperture configured to transmit the radio frequency waveform at a pre-determined polarization state,
the second sheet comprises a second electrically conductive pattern forming a second period structure of unit-cells in the extension direction, wherein the second periodic structure is associated with the height, where each unit-cell of the second periodic structure of unit-cells comprises an aperture configured to transmit the radio frequency waveform at the pre-determined polarization state,
the height is determined in dependence of the center frequency and/or the bandwidth of the radio frequency waveform such that the pre-determined polarization state is provided as well as matching between the PPW and a transmission medium of the radio frequency waveform, and
integrating the first sheet and the second sheet at a peripheral edge of the PPW.

20. The method of claim 19, further comprising:
producing the plurality of developable sheets as separate metal sheets with edges configured to be received in slots formed in the PPW; and/or
producing the plurality of developable sheets as metallized surfaces on one or more dielectric carrier members.

* * * * *